(12) United States Patent
Liu (10) Patent No.: US 9,703,267 B2
(45) Date of Patent: Jul. 11, 2017

(54) METHOD AND APPARATUS FOR VISUALLY AUTHENTICATING PHOTOS

(71) Applicant: Weiou, Inc., Piedmont, CA (US)

(72) Inventor: Qiuyuan Liu, Piedmont, CA (US)

(73) Assignee: WEIOU, INC., Piedmont, CA (US)

( * ) Notice: Subject to any disclaimer, the term of this patent is extended or adjusted under 35 U.S.C. 154(b) by 0 days.

(21) Appl. No.: 14/747,708

(22) Filed: Jun. 23, 2015

(65) Prior Publication Data

US 2015/0381371 A1   Dec. 31, 2015

Related U.S. Application Data

(60) Provisional application No. 62/017,299, filed on Jun. 26, 2014.

(51) Int. Cl.
| | |
|---|---|
| *G04F 10/00* | (2006.01) |
| *H04L 9/32* | (2006.01) |
| *G06T 1/00* | (2006.01) |
| *G06K 9/62* | (2006.01) |
| *G06K 9/46* | (2006.01) |

(52) U.S. Cl.
CPC ............ *G04F 10/00* (2013.01); *G06K 9/46* (2013.01); *G06K 9/6201* (2013.01); *G06K 9/6215* (2013.01); *G06T 1/0021* (2013.01); *H04L 9/3247* (2013.01); *H04L 9/3255* (2013.01)

(58) Field of Classification Search
CPC ........ G04F 10/00; G06K 9/46; G06K 9/6201; G06K 9/6215; G06T 1/0021; H04L 9/3255

USPC ....................................................... 382/190
See application file for complete search history.

(56) References Cited

U.S. PATENT DOCUMENTS

| | | | | |
|---|---|---|---|---|
| 5,765,176 A | * | 6/1998 | Bloomberg | G06T 11/00 345/634 |
| 2004/0225966 A1 | * | 11/2004 | Besharat | G06Q 10/109 715/705 |
| 2005/0281434 A1 | * | 12/2005 | Handley | G06K 9/186 382/100 |
| 2010/0124408 A1 | * | 5/2010 | Maeoka | H04N 5/765 386/329 |

FOREIGN PATENT DOCUMENTS

JP        EP 0982930 A2 *  3/2000  ........... G06T 1/0021

* cited by examiner

*Primary Examiner* — Amandeep Saini
(74) *Attorney, Agent, or Firm* — Zareefa B. Flener; Flener IP Law (57) ABSTRACT

A method for visually authenticating photos comprises: calculating a first digital signature based on photo data corresponding to a photo to obtain first signature data, and storing the first signature data; and when a picture is displayed, implementing signature verification based on the picture data corresponding to the picture and the first signature data, and displaying an authentic mark with the picture when the signature verification succeeds. An apparatus for creating and assigning photos and an apparatus for visually authenticating photos are also disclosed.

7 Claims, 9 Drawing Sheets

Authentic
304

1.5x
512

0.75x
514

Cropped
516

Cut
518

Change
522

Change 2
524

METHOD AND APPARATUS FOR VISUALLY AUTHENTICATING PHOTOS

CROSS-REFERENCE TO RELATED APPLICATIONS

This application claims the benefit and priority of provisional application No. 62/017,299 filed on Jun. 26, 2014, which is incorporated herein in their entirety by reference.

TECHNICAL FIELD

The disclosed embodiments relate to digital authentication technology, and more particularly to a method and an apparatus for visually authenticating photos.

BACKGROUND

Nowadays there are many photos circulated on the internet for communications of all purposes, and photos can be easily edited with many handy software programs and applications with various effect filters, for example, Photoshop, GIMP or Instagram. For convenience of description, an edited photo is called a picture thereinafter. That is, a photo is a picture taken with a camera and is an exact representation of the original object, e.g. a person, or a scene etc. All photos are pictures. But besides photos, pictures include drawings, paintings or computer-generated images as well. Under this clarification, an edited photo may not be a photo any more, instead, it can only be called a picture.

For entertainment or for misinformation purposes, many internet users would present manipulated pictures as photos. The manipulation is made possible to common users by above-mentioned handy software programs and applications with various effect filters. Therefore, often times it is difficult, if possible at all, for a viewer to tell whether a picture is an authentic photo or has been manipulated or altered. When the viewer can't tell, he or she risks getting wrong information or misunderstanding what the picture represents.

Figure 1:
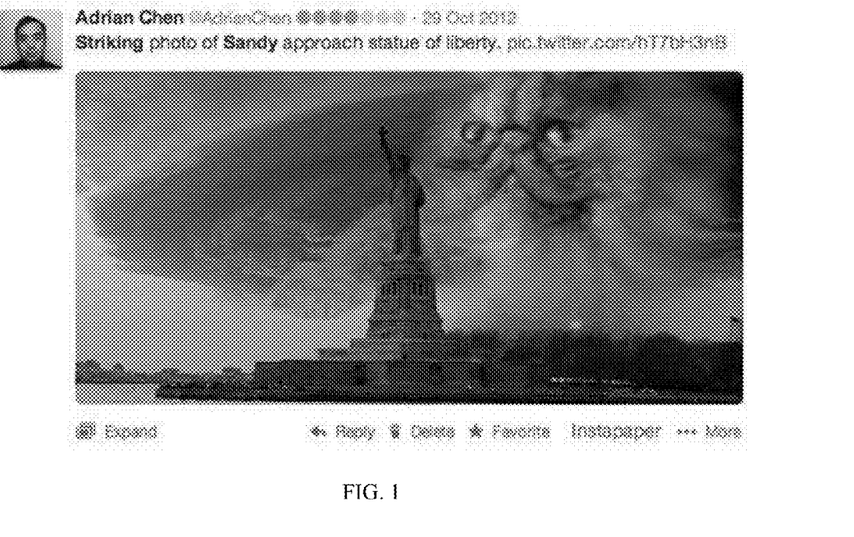
FIG. 1 illustrates a picture that was altered to depict Hurricane Sandy in the prior art.

For example, FIG. 1 illustrates a picture that was altered to depict Hurricane Sandy. Obviously, it is fake. However, if someone believed the picture served for entertainment purposes or for misinformation purposes, he might panic, or might take wrong actions and suffer unnecessary loss or get hurt. Also the fact that someone being unable to tell whether a picture is authentic can severely hurt the trust for the internet. Yet there is no solution provided for one to tell a picture presented is an authentic photo or not.

SUMMARY

Embodiments of the present invention are directed to a method for visually authenticating photos.

Embodiments of the present invention are also directed to an apparatus for creating and signing photos.

Embodiments of the present invention are also directed to an apparatus for visually authenticating photos.

According to one or more embodiments of the present invention, there is provided a method for visually authenticating photos, comprising: calculating a first digital signature based on photo data corresponding to a photo to obtain first signature data, and storing the first signature data; and when a picture is displayed, implementing signature verification based on the picture data corresponding to the picture and the first signature data, and displaying an authentic mark with the picture when the signature verification succeeds.

According to one or more embodiments of the present invention, there is provided an apparatus for creating and signing photos, comprising: a photo taking unit for taking a photo to obtain photo data; a signing unit for calculating a digital signature based on the photo data to obtain signature data; and a storing unit for storing the photo data and the signature data to obtain a signed photo file.

According to one or more embodiments of the present invention, there is provided an apparatus for visually authenticating photos, comprising: a picture displaying unit for displaying a picture according to a picture file including picture data and first signature data; a signature verifying unit for implementing signature verification based on the picture data and the first signature data; and an authentic mark displaying unit for displaying an authentic mark with the picture when the signature verification succeeds.

With the method and the apparatus according to embodiments of the present invention, when a photo is created, a signing process is implemented to obtain signature data which is stored with the original photo data. When a picture is displayed, a signature verification is implemented to determine if the picture is the same or almost the same as the original photo, and an authentic mark is displayed with the picture if the signature verification succeeds. Based on the authentic mark, a user is capable of distinguishing true photos and altered photos, so as to avoid misunderstanding and possible wrong actions.

BRIEF DESCRIPTION OF DRAWINGS

These and other aspects will become apparent and more readily appreciated from the following description of the embodiments, taken in conjunction with the accompanying drawings in which.

DETAILED DESCRIPTION

Figure 2:
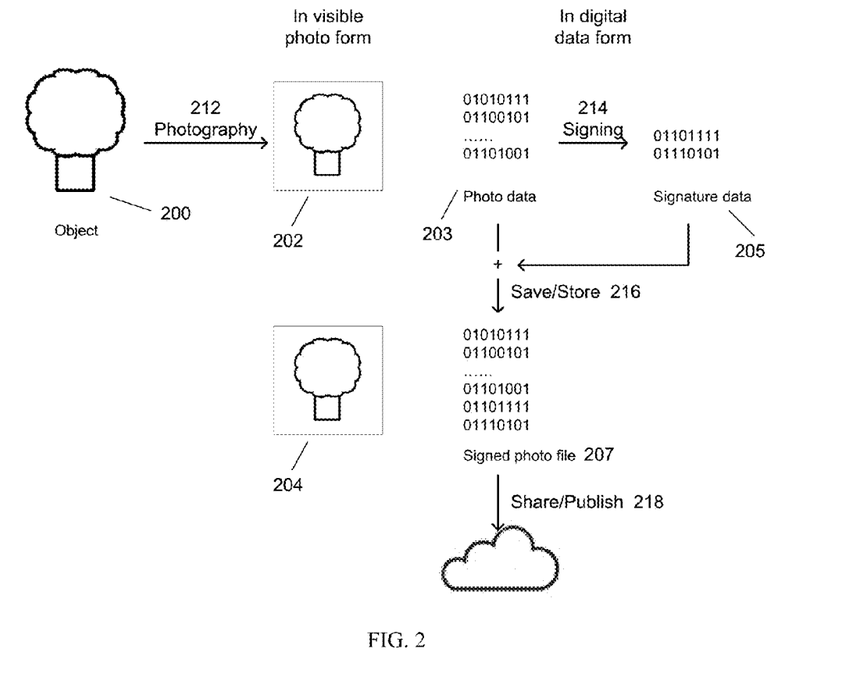
FIG. 2 illustrates a process of creating and signing a photo according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accord- FIG. 2 illustrates a process of creating and signing a photo according to an embodiment of the present invention. In the embodiment, a photo 202 of an object 200 is taken 212 by a photography device. The photo 202 can be displayed in a visible form on the photography device. Inside the photography device the photo 202 is represented in a digital data form of a bit stream of 0s and 1s in the memory, i.e., photo data 203.

The photo data 203 is signed 214 to form signature data 205. That is, in the signing process 214, a digital signature is calculated based on the photo data 203 to form signature data 205. The signing process doesn't alter the original photo data 203 so the visible form 204 of the photo after signing remains the same as photo 202 before signing. The original photo data 203 and the signature data 205 are both saved 216 in a signed photo file 207. The signed photo file 207 can then be sent 218, e.g., shared or published, to an external device, e.g., a cloud service provider.

Figure 3:
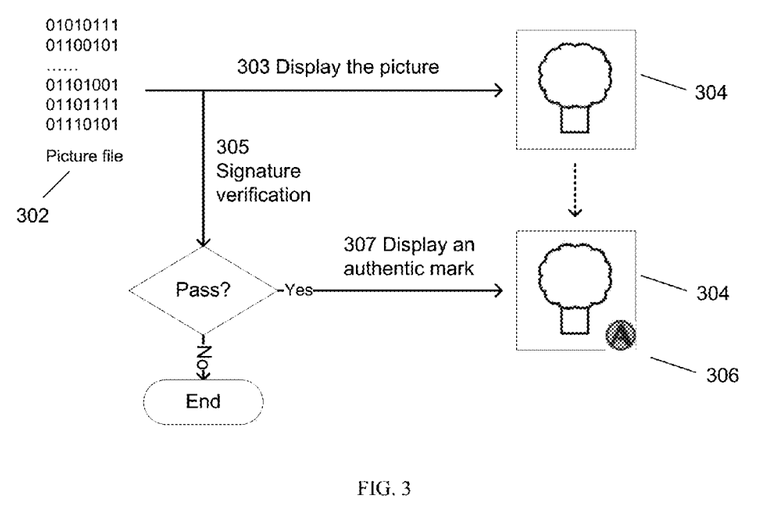
FIG. 3 illustrates a process of authenticating and displaying a picture according to an embodiment of the present invention.

FIG. 3 illustrates a process of authenticating and displaying a picture according to an embodiment of the present invention. In the embodiment, a picture 304 represented by the data in the picture file 302 is displayed 303 on a viewer's device. And signature verification is implemented 305. In detail, picture data is extracted from the picture file 302, and a digital signature is calculated based on the extracted picture data, and then the calculated digital signature is compared with the signature data included in the picture file 302. If they are the same, it means that the picture file 302 is kept intact, that is, is the same as the signed photo file 207, the verification will succeed and an authentic mark 306 will be displayed with the picture 304. With this visible authentic mark 306, the viewer is able to tell the photo is authentic. Instead, if the calculated digital signature is not the same as the signature data included in the picture file 302, it means that the picture file 302 is an altered photo file on the basis of the signed photo file 207, the verification will fail and no authentic mark 306 will be displayed with the picture 304. Since there is no visible authentic mark 306 with the picture 304, the viewer is able to tell the photo is not authentic.

Figure 4:
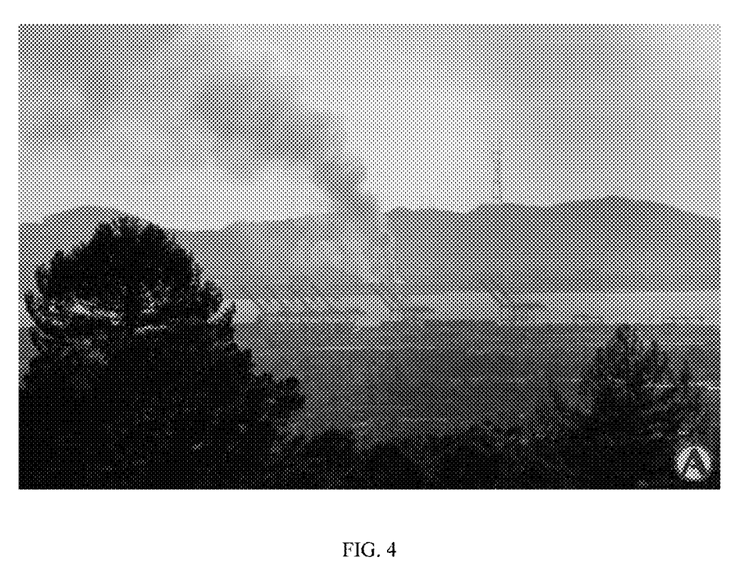
FIG. 4 illustrates a picture displayed with a sample authentic mark.

In an embodiment, the visible authentic mark 306 is not displayed by default. It can be displayed upon the viewer's choice or inquiry. The visible authentic mark 306 can be a predefined pattern displayed on the picture 304. However, the present invention is not limited thereto. In other embodiments, the visible authentic mark 306 can be in any form that a viewer can depend on to tell whether the picture is authentic or kept intact since its creation, and can be in any place of the picture. FIG. 4 illustrates a sample picture that has a visible authentic mark 306 displayed at the bottom right corner of the picture.

The fact that a picture file fails verification may have various reasons, for example, the picture file is not signed at all and doesn't carry a digital signature, or the file has been resaved and lost the digital signature, or the photo is altered that the data is changed and it doesn't match the digital signature any more, etc. A viewer, depending on the type of the failures, can tell whether a file doesn't carry a signature, or the signature doesn't match the data and that the information represented by the picture may not be fully trustable, etc. In an embodiment of the invention, such failure information can be displayed, or can be displayed upon the viewer's choice or inquiry.

In an embodiment of the invention, the photo data that is signed can include various information, for example, time, location, situation, event, author, device, a story about the photo, etc, that the photo taker opts to put in. From such information, a viewer can understand more of what a photo represents.

Figure 5:
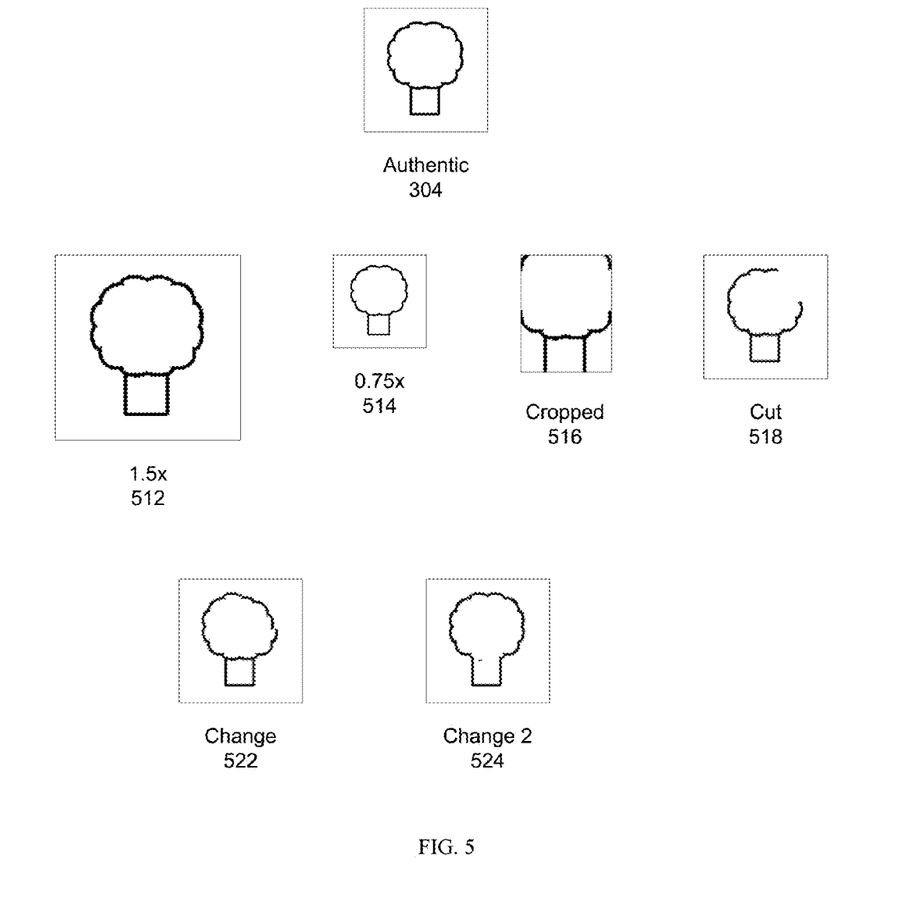
FIG. 5 illustrates various forms of picture changing.

In an embodiment of the invention, a photo which is edited in certain forms, for example, it is shrunk, or enlarged, or cropped, or cut at the edge, etc., that the resultant picture doesn't add any new information other than what's already in the original picture, can obtain an implied authentic status based on the original photo. For example, FIG. 5 illustrates various forms of changing a picture 304. Picture 512 is 1.5 times enlarged. Picture 514 is 0.75× shrunk. Picture 516 is cropped. Picture 518 is cut in the upper right corner. These changes all cause changes in the photo data and the digital signature on the original data will fail verification. But in the human visible form, they won't cause any misinformation to a viewer. They are trustable and can be assigned an implied authentic status. But the changes in picture 522, i.e. moving the upper right edge inward and changing the tree crown, and the changes in picture 524, i.e., omitting the intersection line between the tree crown and the trunk, alter what the original picture represents. They will not get an authentic status.

Figure 6:
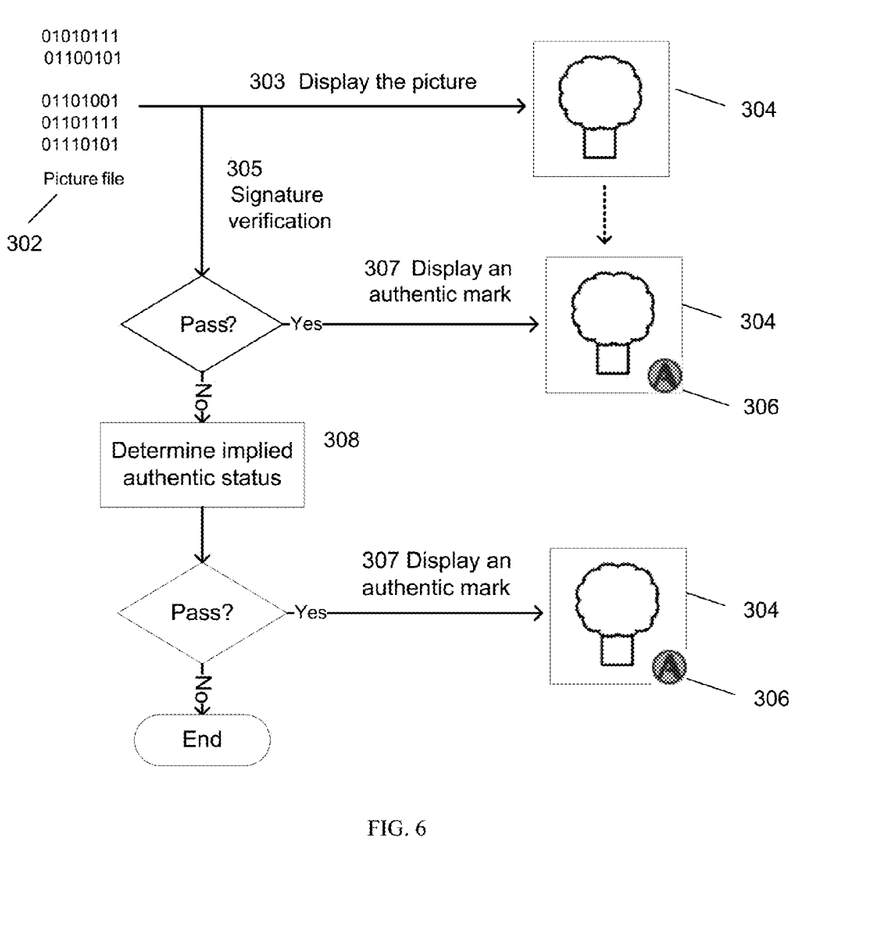
FIG. 6 illustrates a process of authenticating and displaying a picture according to another embodiment of the present invention.

FIG. 6 illustrates a process of authenticating and displaying a picture according to another embodiment of the present invention. Compared with the embodiment shown in FIG. 3, in this embodiment, a step 308 of determining implied authentic status is further implemented if the signature verification process 305 shown in FIG. 3 fails. If the implied authentic status is determined in step 308, an authentic mark can be displayed 307 also. In contrast, if the implied authentic status is not determined, no authentic mark will be displayed.

Figure 7:
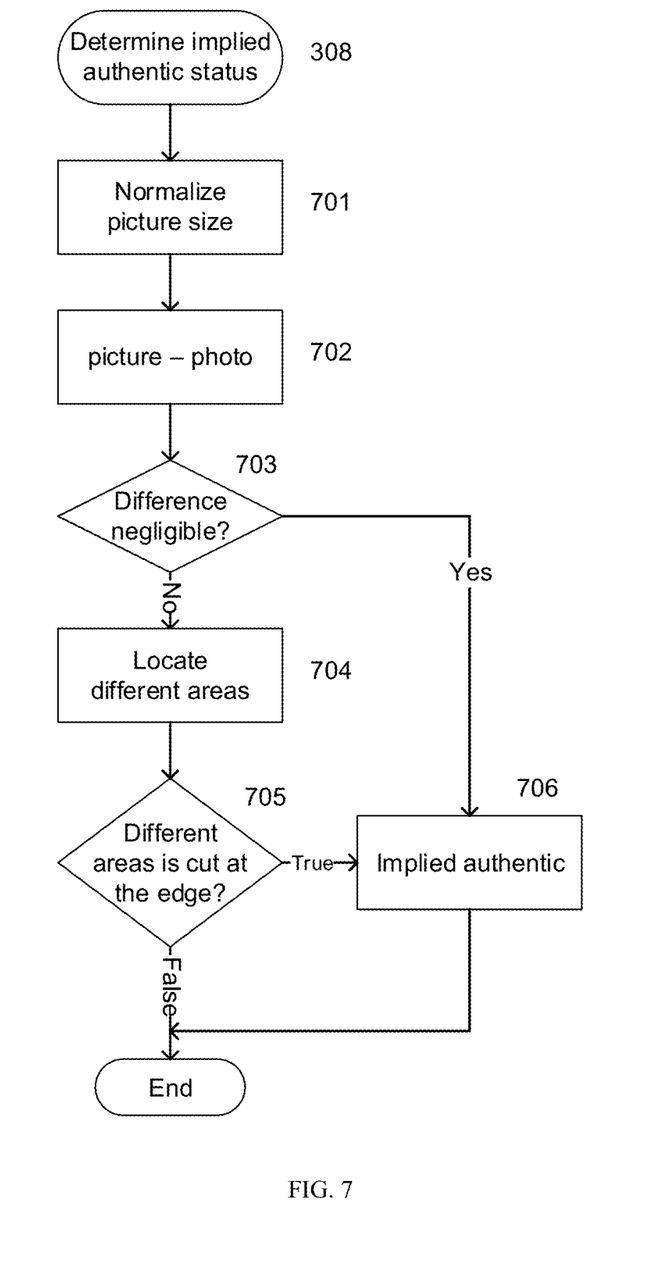
FIG. 7 illustrates detailed steps of determining implied authentic status in FIG. 6.

FIG. 7 illustrates detailed steps of determining implied authentic status in FIG. 6. In an embodiment, the changed picture is normalized 701 to the same size of the original photo. The difference between the picture and the original photo is calculated 702, for example, by subtraction, or xor (exclusive or) operation. Then the difference is checked 703 if it's negligible, if so, the implied authentic status is determined and assigned 706, and then an authentic mark will be displayed 307 as shown in FIG. 6. For the sample pictures 512 and 514 in FIG. 5, the difference is negligible and they can pass the check in 703. For the other pictures in FIG. 5, the difference will be too big to be negligible and fail the check in 703.

In an embodiment, after the check in 703 fails, the areas with the big difference are located 704, and checked 705 if they are cut at the edge of the original photo and missed in the picture. If so, it means the picture is only smaller than the original photo but whatever remained in the picture is the same as the original photo, so the implied authentic status can also be determined and assigned 706, and then an authentic mark will be displayed 307 as shown in FIG. 6. This situation applies to picture 518. With certain object extraction algorithms in advanced image processing, which is beyond the scope of this invention, picture 516 can also be processed and assigned an implied authentic status. In contrast, if the check in 705 fails, for example for pictures 522 and 524 shown in FIG. 5, implied authentic status will not be assigned.

Figure 8:
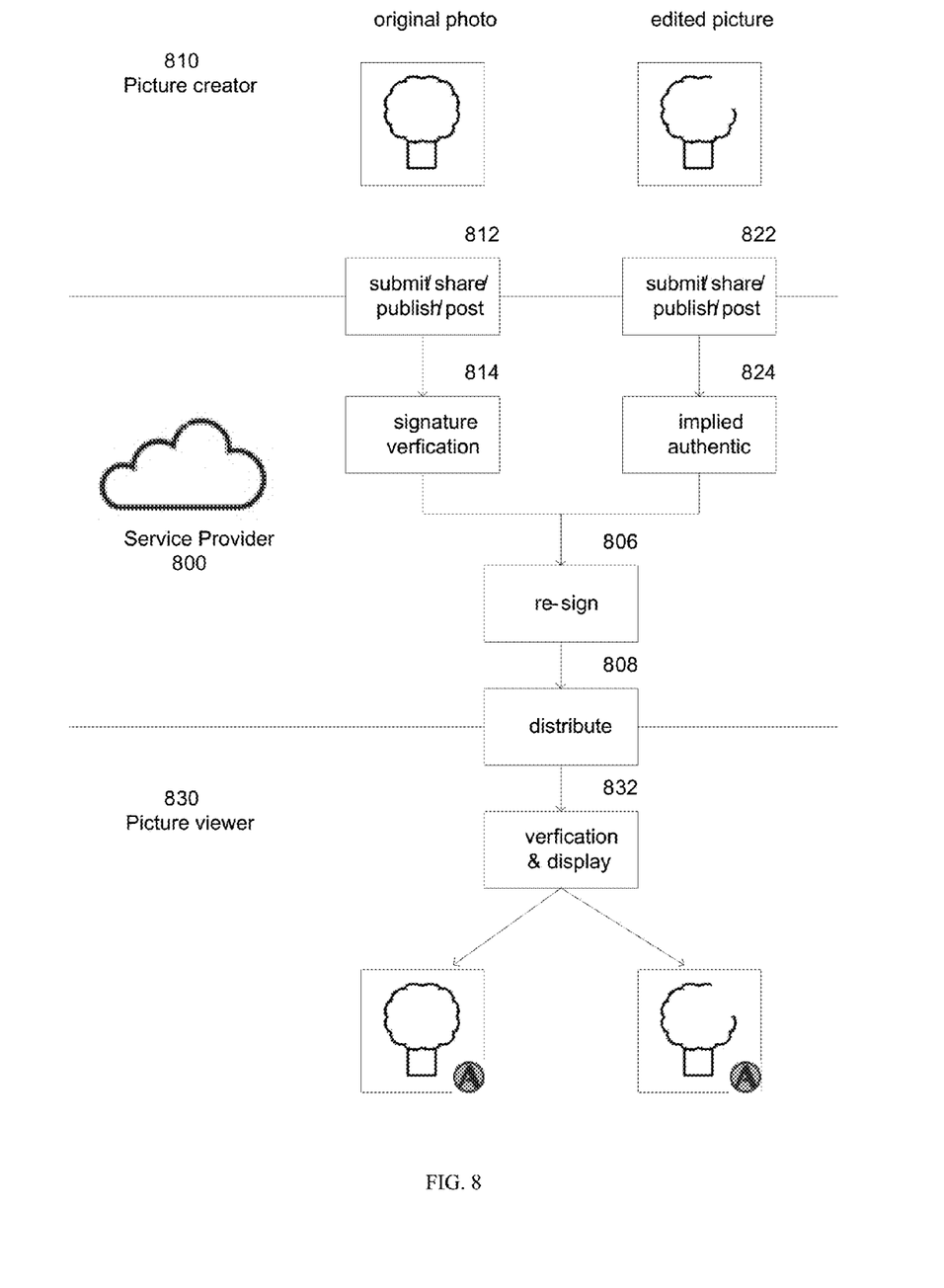
FIG. 8 illustrates a process of resigning photos or pictures.

FIG. 8 illustrates a process of resigning photos or pictures. In an embodiment, a picture creator 810 can send 812, e.g., submit, share, publish or post, a signed photo to a service provider 800 which may be a cloud service provider. The service provider 800 verifies 814 the signature and determines the photo is authentic. Or the picture creator 810 can send 822, e.g., submit, share, publish or post, an edited picture and the original photo and request an implied authentic status for the edited picture based on the original photo. The service provider 800 can, through the determination process illustrated in FIGS. 6 and 7, determine and assign 824 the edited picture an implied authentic status. In the situations that implied authentic status can't be determined by the process automatically, the edited picture and the original photo can be sent to a human operator to review and decide. After the signature is verified 814 or determined 824, the service provider 800 can resign 806 the photo or picture and distribute 808 it. A picture viewer 830 can verify and display 832 the photo or picture with an authentic mark as described in FIG. 3.

Figure 9:
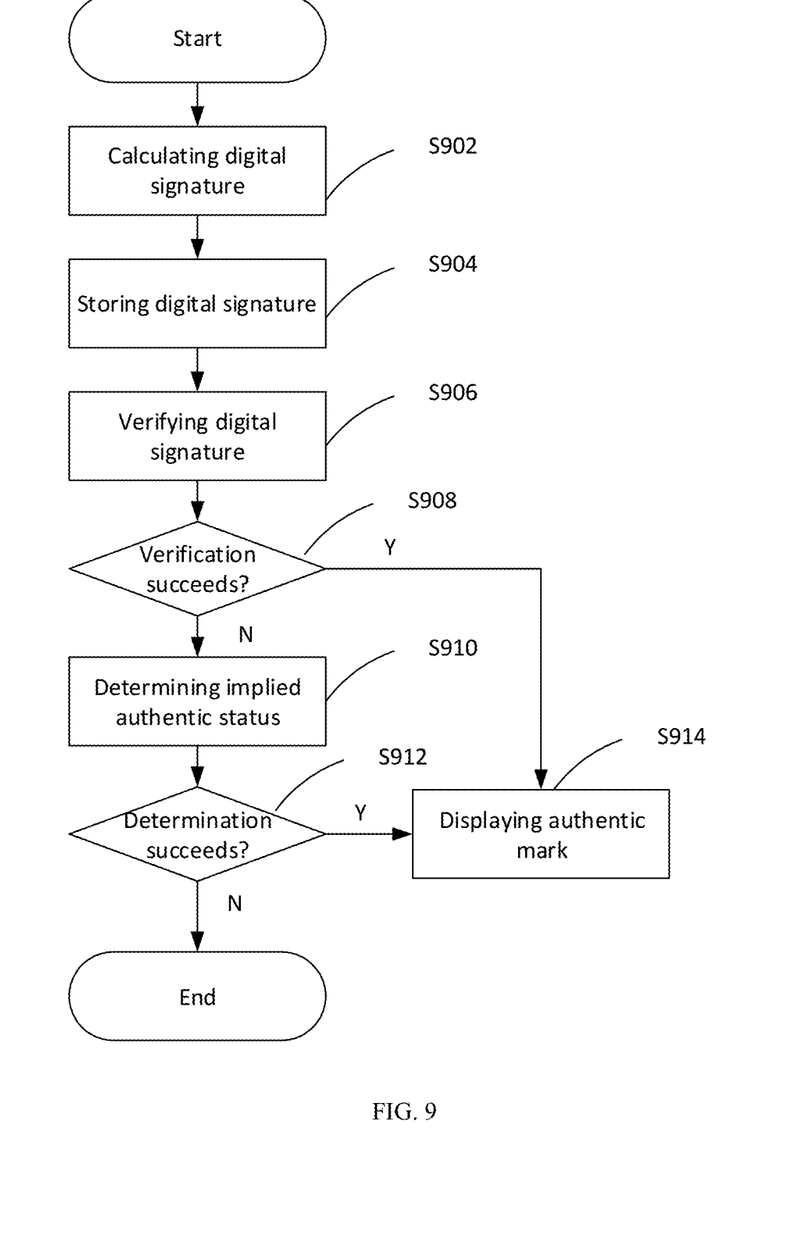
FIG. 9 is a flowchart illustrating a method of visually authenticating photos.

FIG. 9 is a flowchart illustrating a method of visually authenticating photos, which includes the processes shown in FIGS. 2, 3, 6 and 7.

As shown in FIG. 9, at step S902, a digital signature is calculated based on photo data corresponding to a photo to obtain signature data.

At step S904, the signature data is stored with the photo data.

At step S906, when a picture is displayed, signature verification is implemented. For example, picture data is extracted from a picture file corresponding to the picture, and a digital signature is calculated based on the extracted picture data to obtain signature data corresponding to the picture, and then the signature data corresponding to the picture is compared with the signature data which is generated at step S902 and is stored with the photo data at step S904.

At step S908, it is determined whether the verification succeeds, for example if the digital signature calculated at step S906 is the same as the digital signature calculated at step S902. If so, an authentic mark will be displayed with the picture at step S914.

In contrast, if the verification fails, an implied authentic status is further determined at step S910. The details of the determination process have been described above with reference to FIGS. 5-7, and thus is not repeated here. If an implied authentic status has been successfully determined, an authentic mark will be displayed with the picture at step S914.

In an embodiment, before step S912, a resigning process shown in FIG. 8 may be further implemented. That is, after step S908 or step S912, a new digital signature is calculated based on photo data or picture data, and the new digital signature is stored with the photo data or picture data. When a picture is displayed, signature verification is implemented for the new digital signature. If there is no alteration between resigning and displaying, the signature verification is implemented for the new digital signature will succeed and step S914 will be implemented. That is, an authentic mark will be displayed with the picture.

Figure 10:
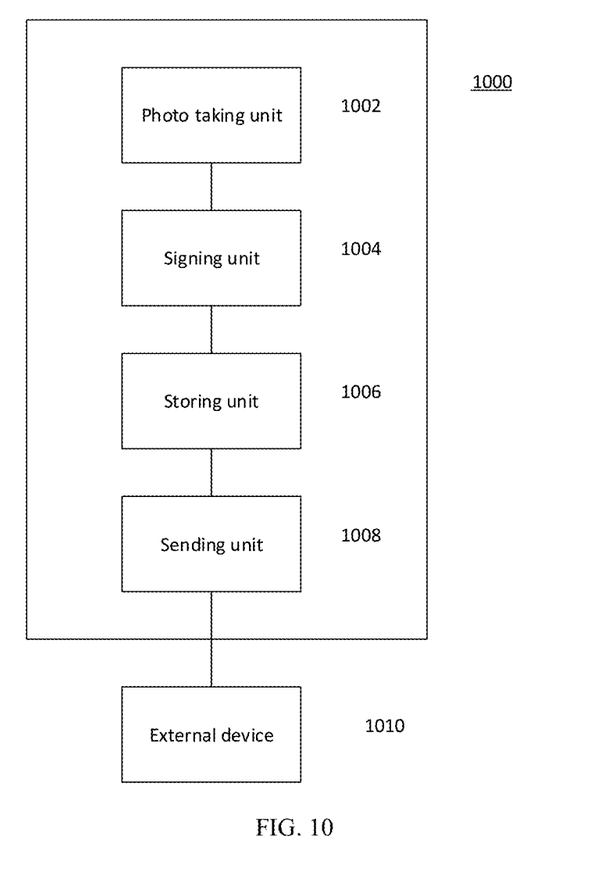
FIG. 10 illustrates schematic structure of an apparatus for creating and signing photos.

The process of creating and signing a photo shown in FIG. 2 may be implemented in an apparatus for creating and signing photos. FIG. 10 illustrates schematic structure of such an apparatus according to an embodiment of the present invention. Referring to FIG. 10, the apparatus 1000 for creating and signing photos includes a photo taking unit 1002 for taking a photo according to user's operation to obtain photo data, a signing unit 1004 for implementing calculation based on the photo data to obtain signature data, and a storing unit 1006 for storing the photo data and the signature data to obtain a signed photo file.

In an embodiment, the apparatus 1000 further includes a sending unit 1008 for sending, e.g. sharing or publishing, the signed photo file to an external device 1010.

Figure 11:
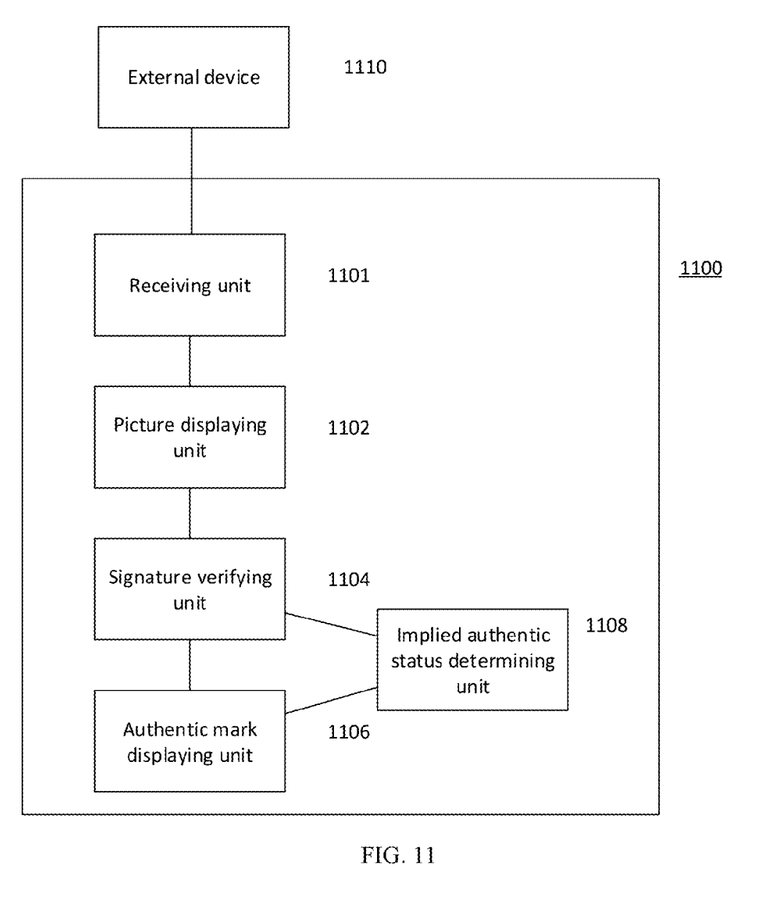
FIG. 11 illustrates schematic structure of an apparatus for visually authenticating photos.

The process of authenticating and displaying a picture shown in FIG. 3 may be implemented in an apparatus for visually authenticating photos. FIG. 11 illustrates schematic structure of such an apparatus. Referring to FIG. 11, the apparatus 1100 includes a picture displaying unit 1102 for displaying a picture according to a picture file, a signature verifying unit 1104 for implementing signature verification, and an authentic mark displaying unit 1106 for displaying an authentic mark with the picture when the verification succeeds.

Here, the signature verifying unit 1104 may extract photo data from the picture file, and calculate a digital signature based on the extracted photo data, and then compare the calculated digital signature with the signature data included in the picture file.

In an embodiment, the apparatus 1100 further includes a receiving unit 1101 for receiving the picture file from an external device 1110.

In an embodiment, an implied authentic status determining unit 1108 which is connected to both of the signature verifying unit 1104 and the authentic mark displaying unit 1106 is further included. The implied authentic status determining unit 1108 is configured to determine an implied authentic status for the picture data if the signature verification implemented in the signature verifying unit 1104 fails. The details of the process of determining an implied authentic status for the picture data has been described above with reference to FIGS. 5-7 and thus is omitted for reduce redundancy.

The apparatus 1000 for creating and signing a photo can be any device that is capable of taking a digital photo and computing a digital signature based on the given data, for example, a computer, a camera, a phone, digital glasses, or a tablet, etc. The apparatus 1100 for visually authenticating photos can be any device that is capable of computing and verifying a digital signature based on the given data and displaying a picture, for example, a computer, a camera, a phone, digital glasses, or a tablet, etc.

The apparatus 1000 for creating and signing photos and the apparatus 1100 for visually authenticating photos may be integrated in one device, such as a phone. In this case, the phone can take photos, sign the photos and store the signed photos, and also can verify the signature and display an authentic mark when displaying the photos.

Alternatively, the apparatus 1000 for creating and signing photos and the apparatus 1100 for visually authenticating photos may be disposed in different devices, for example the former may be a phone and the latter may be a computer. In this case, the phone can take photos, sign the photos and store the signed photos, and then send the signed photos to the computer. The computer can receive the picture file from the phone, and then verify the signature and display an authentic mark when displaying the picture.

It can be understood that the signing and verification can be processed by any algorithm for the digital signature purpose. And by adopting such established digital signature algorithms, different vendors can cooperate in one system or service that photos taken by one vendor's device or software system get verified on another vendor's device or software system.

A video can be considered as a series of pictures with or without audio, each being called a frame. A video can be taken by a camera or a camcorder, or recorded by a video recorder, or created by a device from other videos or pictures. In an embodiment of the invention, a video can be signed upon a single frame or multiple frames in a continuous form. When a video is played, the digital signature data can be verified and if the verification succeeds, a visible authentic mark can be displayed by default or upon the viewer's choice or inquiry that the viewer can tell a video is authentic without having to reach the end of the video, or no visible authentic mark is displayed if verification fails, as described above in the photo verification.

Figure 12:
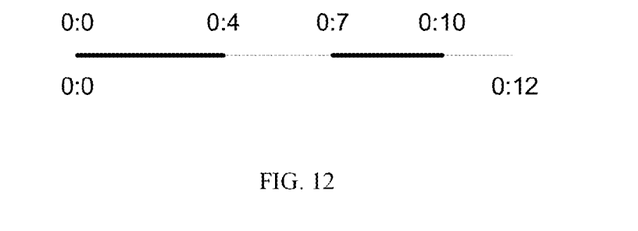
FIG. 12 illustrates sample authentic marks for a video.

In an embodiment of the invention, the authentic mark for a video can be a continuous form on a time axis. For example, as illustrated in FIG. 12, a video of 12 seconds has 2 parts that pass verification at the beginning (time 0:0) for 4 seconds (clip 0:0~0:4) and at 7 seconds for 3 seconds (clip 0:7~0:10), displayed by thicker lines.

An audio can be considered as a video with only audible data and without any pictures when it is played by a player. In an embodiment of the invention, an audio can be signed upon certain length of time that the audio creator selects, for example, a second, seconds, or any longer period, etc. An audio can be played by a player and the digital signature data can be verified and if the verification succeeds, a visible authentic mark can be displayed, or no visible authentic mark is displayed if verification fails, as described above in the video verification.

Since it can be understood that a video is a combination of photos and an audio is a special kind of video, all of the embodiments which take a photo as an example can be applied to video and audio as well. And thus repeated description for videos and audios will be omitted for reducing redundancy.

With the method and the apparatus according to embodiments of the present invention, when a photo is created, a signing process is implemented to obtain signature data which is stored with the original photo data. When a picture is displayed, a signature verification is implemented to determine if the picture is the same or almost the same as the original photo, and an authentic mark is displayed with the picture if the signature verification succeeds. Based on the authentic mark, a user is capable of distinguishing true photos and altered photos, so as to avoid misunderstanding and possible wrong actions.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A method for visually authenticating photos, comprising:
   calculating a first digital signature based on photo data corresponding to a photo to obtain first signature data, and storing the first signature data; and
   when a picture is displayed, extracting picture data from a picture file corresponding to the picture, calculating a second digital signature based on the extracted picture data to obtain second signature data, and comparing the second signature data with the first signature data;
   when the second signature data and the first signature data are identical, displaying an authentic mark with the picture; and
   when the second signature data and the first signature data are not identical, determining an implied authentic status, and displaying the authentic mark with the picture when the implied authentic status is determined,
   wherein the determining an implied authentic status comprises:
   normalizing the picture to a same size of an original photo corresponding to the picture;
   calculating a difference between the normalized picture and the original photo; and
   checking whether the calculated difference is zero or not, and assigning an implied authentic status if the calculated difference is zero.

2. The method of claim 1, further comprising locating areas with the calculated difference and checking if the areas with the calculated difference are cut at an edge of the original photo after it is determined the calculated difference is not zero; and assigning the implied authentic status if checking result is positive.

3. The method of claim 1, further comprising resigning the picture after displaying the authentic mark with the picture.

4. The method of claim 1, wherein the authentic mark is a predefined pattern displayed on the picture.

5. An apparatus for visually authenticating photos, comprising:
   a picture displaying unit for displaying a picture according to a picture file including picture data and first signature data;
   a signature verifying unit configured to: extract the picture data from the picture file; calculate a second digital signature based on the extracted picture data to obtain second signature data; and compare the second signature data with the first signature data included in the picture file;
   an implied authentic status determining unit configured to determine an implied authentic status for the picture data when the second signature data and the first signature data are not identical; and
   an authentic mark displaying unit for displaying an authentic mark with the picture when the second signature data and the first signature data are identical or when the implied authentic status for the picture data is determined,
   wherein the implied authentic status determining unit determines the implied authentic status by:
   normalizing the picture to a same size of an original photo corresponding to the picture;
   calculating a difference between the normalized picture and the original photo; and
   checking whether the calculated difference is zero or not, and assigning an implied authentic status if the calculated difference is zero.

6. The apparatus of claim 5, further comprising a receiving unit for receiving the picture file from an external device.

7. The apparatus of claim 5, wherein when the calculated different difference is not zero, the implied authentic status determining unit further determines the implied authentic status by:
   locating areas with the calculated difference and checking if the areas with the calculated difference are cut at an edge of the original photo; and assigning the implied authentic status if checking result is positive.

* * * * *